United States Patent [19]

Waddill

[11] Patent Number: 5,001,211
[45] Date of Patent: Mar. 19, 1991

[54] SALICYLATE OF 1-ISOPROPYL-2-METHYL IMIDAZOLE AS AN EPOXY RESIN CURATIVE

[75] Inventor: Hrold G. Waddill, Austin, Tex.

[73] Assignee: Texaco Chemical Company, White Plains, N.Y.

[21] Appl. No.: 427,556

[22] Filed: Oct. 26, 1989

[51] Int. Cl.$^5$ .............................................. C08G 59/68
[52] U.S. Cl. ..................................... 528/94; 528/100; 528/408
[58] Field of Search ........................ 528/94, 100, 408

[56] References Cited

U.S. PATENT DOCUMENTS

| | | | |
|---|---|---|---|
| 4,487,914 | 12/1984 | Barton | 528/94 X |
| 4,529,537 | 7/1985 | Dockner et al. | 528/94 X |
| 4,559,398 | 12/1985 | Tesch et al. | 528/94 |
| 4,931,528 | 6/1990 | Waddill et al. | 528/94 |
| 4,933,422 | 6/1990 | Hammer | 528/94 |

*Primary Examiner*—Earl Nielsen
*Attorney, Agent, or Firm*—Jack H. Park; Kenneth R. Priem; Cynthia L. Kendrick

[57] ABSTRACT

Disclosed in an epoxy resin curative exhibiting extended pot life, lower reactivity at ambient temperatures and increased reactivity at moderately elevated temperatures which comprises from 2 to 10 parts by weight of 1-isopropyl-2-methyl imidazole salicylate per 100 parts by weight epoxy resin. The latent reactive properties make the curative potentially useful in a variety of applications.

7 Claims, No Drawings

SALICYLATE OF 1-ISOPROPYL-2-METHYL IMIDAZOLE AS AN EPOXY RESIN CURATIVE

BACKGROUND OF THE INVENTION

Cross-Reference

This application is related to U.S. application Ser. Nos. 07/284,884 and 07/348,824 filed Dec. 15, 1988 and May 8, 1989, respectively.

FIELD OF THE INVENTION

This invention relates to epoxy resin curing agents. More particularly this invention relates to the use of the salicylate salt of 1-isopropyl-2-methyl imidazole in curing epoxy resin systems to provide fully cured system with exceptional resistance to heat and chemicals. Further epoxy systems with this novel curative demonstrate added latency, in that they are much less reactive at ambient temperatures and have increased reactivity at elevated temperatures, thus providing a variety of application possibilities.

RELATED ART

Epoxy resins include a broad class of polymeric materials having a wide range of physical properties. The resins are characterized by epoxide groups which are cured by reaction with certain catalysts or curing agents to provide cured epoxy resin compositions with various desirable properties.

The most common epoxy resins are condensation products of epichlorohydrin and bisphenol A. These systems can be cured with conventional curing agents such as polyamines, polycarboxylic acids, anhydrides and Lewis acids. Bisphenol A based epoxy compositions, when cured, have good adhesive properties, however many are inherently stiff and brittle and hence their use is limited to applications where peel forces do not come into play.

It is known in the art to use substituted imidazoles as curing agents for epoxy resins. In [95] Chemical Week, July 31, 1965 it is stated imidazoles generally offer, when used at low concentration, DT's to 150° C. with DGEBA and other elevated-temperature properties in the range expected of aromatic amine cures. This improved heat resistance is obtained with a super-cooled liquid having a viscosity of 4000 to 8000 centipoises and providing a long pot life. Generally, imidazoles are in solid form and cause predictable results with the resin to be cured. For instance, one could expect a substantial amount of gelling of the resin at lower temperatures.

It is known to use salts of imidazoles and alkyl imidazoles as semi-latent expoxy curatives as described in data sheets from Shikodu titled

"CUREZOL 2MZ-OK,, 2PZ-OK"

In this case what is disclosed are isocyanuric acid addition compounds in the form of crystals. Such salts are usually solid products which either melt or decompose at rather high temperatures.

New curing agents for epoxy resins are useful and desirable, especially if they demonstrate improved properties. It would be an advance in the art to provide an imidazole epoxy resin curing agent which was a liquid under normal ambient conditions, rather than solid, and one which would easily dissolve and mix with many epoxy systems. Further, it would be an advance in the art if the curative added latency to the epoxy systems to which it was added. If such a curative could provide epoxy systems with extended pot life which might be fully cured with application of moderate heat for relatively short periods of time, this would constitute improvements over what is available in the art. If such systems when fully cured could demonstrate acceptable physical properties with exceptional resistance to heat and chemicals there would be a number of needs met in the art. If a curative with the above properties also allowed for variations in reactivity over a broad range of temperatures, this would be particularly desirable and a variety of potential applications would be apparent to those skilled in the art.

It has now been discovered that the salicylate salt of 1-isopropyl-2-methyl imidazole oan be employed in liquid form as an epoxy resin curative to provide these and other desirable properties.

SUMMARY OF THE INVENTION

The present invention is directed to a novel salt, the salicylate of an imidazole, and to its use as a curative of epoxy resins. This liquid imidazole salt used as an epoxy resin curative at moderate temperatures, provides materials which when cured exhibit a high degree of heat and chemical resistance.

It has also been discovered that a low rate of reactivity is observed at ambient temperatures and an increased rate of reactivity is observed at moderately elevated temperatures, thus adding latency in curing to epoxy systems to which it is added.

DETAILED DESCRIPTION

The imidazole used as a curing agent of uncured epoxy resins in the present invention is a member of a group of imidazoles having the following general formula:

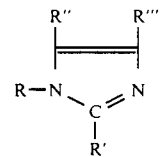

wherein R is H or an alkyl group containing 1 to 18 carbon atoms, R' is H or an aromatic or alkyl group containing 1 to 17 carbons, R" is H or an alkyl group containing 1-4 carbon atoms, and R''' is H or an alkyl group containing 1-4 carbon atoms.

In the instant invention it has been discovered that the salicylate salt of a particular imidazole, 1-isopropyl-2-methyl imidazole demonstrates properties which make it particularly valuable as a curing agent. The imidazole reactant has been produced in high yields by a process disclosed in related copending application Ser. No. 07/284,884 incorporated herein by reference. The 1-isopropyl-2-methyl imidazole is prepared by a method comprising dehydrogenation of imidazolines over a catalyst consisting of nickel in combination with from 2 to 30 wt% copper or chromium alone or in combination, at a temperature of 160° C. to 250° C. and a pressure of atmospheric to 500 psig.

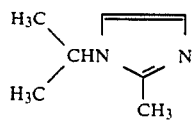

The 1-isopropyl-2-methyl imidazole salicylate is prepared by dissolving salicyclic acid in chloroform with heat and adding isopropyl methyl imidazole slowly. After thorough mixing and refluxing of the reactants, the solvent was removed under vacuum. The product can be represented by the following structure:

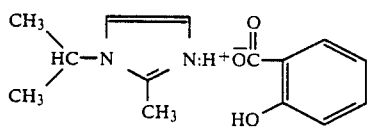

The 1-isopropyl-2-methyl imidazole salicylate demonstrates the following desirable properties as a curing agent:

1. The salt is a liquid material under normal ambient conditions and dissolves easily in many systems.
2. The salt is much less reactive at ambient (25° C.) temperatures than the parent compound, 1-isopropyl-2-methyl imidazole, but demonstrates increased reactivity at elevated temperatures.

When the 1-isopropyl-2-methyl imidazole salicylate is combined with the epoxy resin it results in a curing system which exhibits the following desirable properties:

1. It adds latency to epoxy systems to which it is added.
2. It provides epoxy curing systems with an extended pot life which may be fully cured with application of moderate heat for relatively short periods of time.
3. When fully cured, the epoxy system has acceptable physical properties with exceptional resistance to heat and chemicals.

Products possessing exceptional resistance to heat and chemicals are especially useful in applications such as composite fabrications and sealants.

An epoxy resin which may be cured by the process of this invention may typically be one prepared, for example, by the reaction of Bisphenol A with epichlorohydrin in the presence of sodium hydroxide. After condensation is complete, the crude resin is freed of residual epichlorohydrin, washed well to remove salt and soluble by-products, and recovered. Among those which have demonstrated the effectiveness of the instant invention are diglycidyl ethers of Bisphenol A, such as liquid epoxy resin EEW≃185 (EEW=epoxy equivalent weight; molecular weight of resin=≃380; funotionality≃2; equivalent weight≃185-192).

Epoxy resin is normally used without dilution and without other additives. The curing agent in this case is liquid. More often imidazole curing agents are solids.

The novel imidazole curative should be present in the epoxy resin in an amount sufficient to provide 2 to 10 parts by weight (pbw) of novel imidazole curing agent per 100 parts by weight epoxy resin.

Incomplete curing may be accomplished under ambient conditions. Heating is necessary to cure fully. When the curing is accomplished at ambient conditions the system exhibits what could be described as "latent" reaction properties. The curing takes place slower than with the parent compound at about room temperature. The curing reaction takes place faster than with the parent compound at moderately elevated temperatures, such as 100°-160° C. When the temperature was raised stabilization occurred after about 1 hour, rather than 4 to 10 hours. This can be a very desirable property for certain uses.

Curing takes place over a period of ½ to 4 hours. Optimum physical properties developed using shorter cure times than were required with the parent compound at an elevated temperature.

Practice of the novel method of this invention is apparent from the procedures exemplified in Examples 1-4. The method of curing epoxy resins with the imidazole salts herein described allows for the production of compositions with properties which should have a variety of applications. Many properties which can be obtained by variations of the invention are demonstrated in Example 4.

Example 1 demonstrates preparation of the 1-isopropyl-2-methyl imidazole salicylate.

Example 2 demonstrates the difference in viscosity development between the use of the parent compound as a curative and the use of the salicylate salt as a curative.

Example 3 demonstrates that application of a higher temperature, such as 150° C. to a composition employing the salicylate salt as a curing agent allows for stabilization or a near complete cure within a much shorter time.

In the various Examples the following terms are used to describe properties measured.

Gel Time—Measured in minutes (100 g mass); 100 g of formulation added at ≃23° C. to gel timer container which was maintained at designated temperature. Formulated material allowed to increase in temperature and advance to gelled stage.

Brookfield viscosity—(ASTM D-1824) Internal resistance to flow; ratio of shearing stress to rate of shear measured in centipoises at about 23° C. for different time periods.

HDT—(ASTM D648-72) Heat distortion temperature is the temperature at which a polymer sample distorts under load upon heating under specified conditions. HDT's can also be used to indicate the degree of cross-linking or extent of cure of an epoxy resin.

In Example 4 the following properties are measured:

Shore D hardness—(ASTM D-2240—81) Measured at 0 and at 10 seconds indentation hardness with durometer.

Izod impact strength (ft—lb/in) (ASTM D256—81-)—Izod impact testing is carried out with a pendulum-type device where the test specimen is positioned as a cantilever beam with the notched side facing the striker. Five samples are tested for impact with each formulation with the average being recorded as IZOD impact strength.

Tensile Strength, psi (ASTM D638—80)—The rupture strength (stress/strain product at break) per unit area of material subjected to a specified dynamic load. "Ultimate tensile strength" is the force, at break, when a sample is pulled part.

Tensile Modulus, psi—Stress/strain

Flexural Strength, psi (ASTM D790—80)—A measure of the ability of a material to withstand failure due to bending.

Flexural modulus, psi—Stress/strain

The examples are intended only as a means of illustration and are not to be construed as limitative.

EXAMPLE 1 (6463—23A)

| Preparation of 1-Isopropyl-2-Methyl Imidazole Salicylate | |
|---|---|
| Reactants | Weight, g |
| 1-Isopropyl-2-Methyl Imidazole (IPMIZ) | 12.4 |
| Salicyclic acid | 13.8 |

Salicylic acid was dissolved in 100 g chloroform with heat (under nitrogen). IPMIZ was added slowly. The reactants were thoroughly mixed while refluxing. The solvent was removed under vacuum. The residue (product) was a lightly colored, slightly viscous liquid.

The salt was also prepared by direct addition of salicyclic acid to IPMIZ without a solvent.

EXAMPLE 2

| Comparison of Gel Time, Viscosity Development of IPMIZ and IPMIZ.Salicylate | | |
|---|---|---|
| Property | IPMIZ | IPMIZ Salicylate |
| Concentration, phr | 3 | 5 |
| Gel time (100 g, mass) at | | |
| 60° | 89.6 | 379.9 |
| 80° | 41.1 | 47.1 |
| 100° | 18.3 | 22.0 |
| 120° | 12.5 | 15.4 |
| 150° | 6.7 | 8.7 |

Gel time at 60° C. was considerably longer for the salicylate salt-containing formulation than for IPMIZ, indicating lower reactivity of the salt under mild heating conditions. With higher temperatures, however, gel times for the salt-containing formulation were not significantly different from those with the parent compound.

| | Formulation Containing | |
|---|---|---|
| | IPMIZ | IPMIZ Salicylate |
| Brookfield viscosity @ | | |
| 23° C., initial (100 g mass) | 13200 | 14300 |
| after 8 hours | 20000 | 45000 |
| after 24 hours | 82500 | 48000 |
| after 48 hours | — | 104000 |

Initial viscosity development was more rapid for the salt. However, viscosity stabilized after 8 hours and overall viscosity development was slower for the salt-containing formulation than the IPMIZ.

EXAMPLE 3

| Comparison of Heat Deflection Temperature (HDT) Development with Length of Cure: IPMIZ vs. IPMIZ Salicylate Cures of Epoxy Resin System | | | | | |
|---|---|---|---|---|---|
| Property | Cure Cycle | | | | |
| HDT, °C., 264 psi | 1 | 2 | 3 | 4 | 5 |
| Curative - IPMIZ | 105 | 121 | 137 | 154 | 165 |
| IPMIZ.Salicylate | 65 | 141 | 148 | 150 | 152 |

HDT is a measure of completeness of cure. Achievement of an optimum constant or near-constant value of HDT indicates completion of cure while a low value which increases with further heat curing indicates an incomplete cure.

The results of Example 3 indicate incomplete curing with both systems when curing at 80° C. with the system containing IPMIZ salt being much less cured. Application of a higher temperature for a short period (0.5 hours @ 150° C.) resulted in much higher HDT for the salt-containing formulation. Further curing at 150° indicated stabilization of HDT or a near complete cure after 1 hour with the salicylate formulation, whereas the formulation containing IPMIZ continued to cure during the 4–10 hour cure period. Apparently the salt of the invention results in sluggish curing at lower temperatures but accelerates curing at elevated temperatures.

EXAMPLE 4

| Physical Properties of IPMIZ.Salicylate-Cured Epoxy System | | | | | |
|---|---|---|---|---|---|
| Formulation | | | | | |
| Liquid epoxy resin (EEW ≈ 185–192) | 100 pbw | | | | |
| IPMIZ.Salicylate (6463-23A; HGW) | | | | | |
| Properties of Cured ¼" Castings | 34A | 34B | 34C | 34D | 34E |
| Cured: | 1 | 2 | 3 | 4 | 5 |
| Shore D hardness, 0–10 sec. | 89–87 | 88–87 | 88–86 | 84–82 | 89–87 |
| HDT, °C., 264 psi/66 psi load | 65/68 | 141/157 | 148/163 | 150/160 | 152/163 |
| Izod impact strength, ft-lb/in | 0.08 | 0.08 | 0.08 | 0.08 | 0.10 |
| Tensile strength, psi | 6700 | 6000 | 6200 | 4000 | 3500 |
| Tensile modulus, psi | 525000 | 365000 | 369000 | 357000 | 366000 |
| Elongation at break, % | 1.4 | 2.0 | 2.2 | 1.2 | 1.1 |
| Flexural strength, psi | 17950 | 7500 | 8100 | 9050 | 9900 |
| Flexural modulus, psi | 553500 | 397000 | 389000 | 369000 | 373000 |
| % wt. gain, | | | | | |
| 24-hr water boil | 3.2 | 1.6 | 2.0 | 1.5 | 1.9 |
| 3-hr acetone boil | 6.4 | 0.2 | 0.2 | 0.1 | 0.2 |

[1] Cured 2 hrs, 80° C.
[2] Cured 2 hrs, 80° C., ½ hr, 150° C.
[3] Cured 2 hrs, 80° C., 1 hr, 150° C.
[4] Cured 2 hrs, 80° C., 4 hrs, 150° C.
[5] Cured 2 hrs, 80° C., 10 hrs, 150° C.

As in Example 3, evidence of incomplete curing with IPMIZ.salicylate was shown with the cure cycle of 2 hours at 80° C. (6463k-34A). This was demonstrated with high modulus values (brittleness) and with weight gain results in boiling water and in acetone. However, moderation in modulus values and significant improvement in resistance to boiling water and acetone was shown after curing an additional short period of time at 150° C. Further curing at 150° had a minimal effect on physical properties.

What is claimed is:

1. An epoxy resin curative composition comprising:
   (1) 2 to 10 parts by weight of the salicylate salt of 1-isopropyl-2-methyl imidazole, and
   (2) 100 parts by weight epoxy resin.

2. The composition of claim 1 wherein the epoxy resin is a diglycidyl ether of Bisphenol A having an epoxy equivalent weight (EEW) of 185 to 192.

3. The composition of claim 1 at a temperature of from about 50° C. to about 200° C.

4. The composition of claim 1 at a temperature of 90° C. to 170° C.

5. The composition of claim 1 wherein the system is cured for from 30 minutes to 20 hours.

6. The composition of claim 1 wherein the system is cured for from 4 to 10 hours.

7. A method for curing an epoxy resin comprising the addition of 2 to 10 parts by weight of the salicylate salt of 1-isopropyl-2-methyl imidazole to 100 parts by weight epoxy resin at a temperature of from 90° C. to 180° C. for a period of 3 hours to 12 hours.

* * * * *